July 8, 1958 F. S. FLICK 2,842,284
CYLINDER END SEAL FOR FLUID PRESSURE CYLINDER
Filed Nov. 14, 1955 2 Sheets-Sheet 1
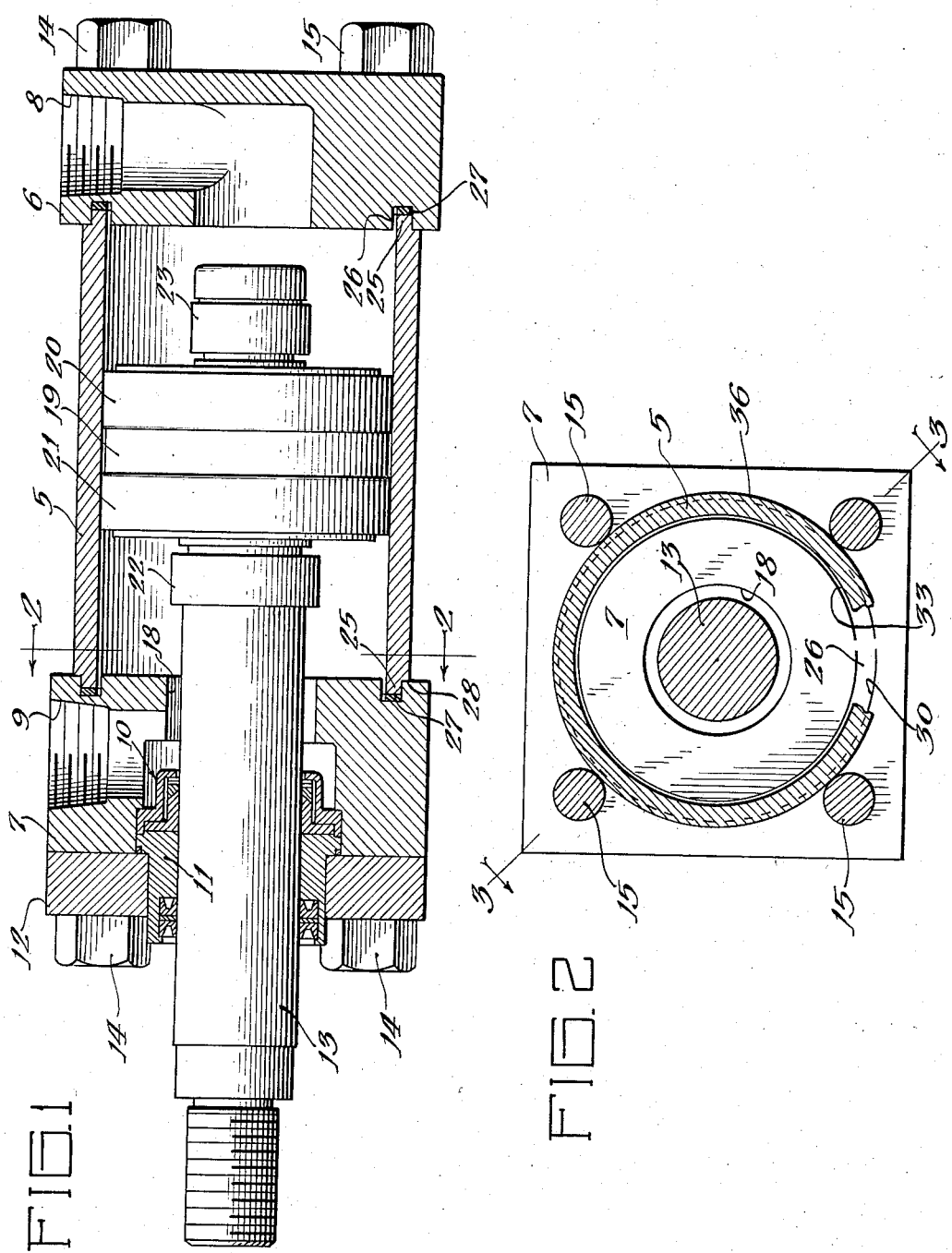
Inventor:
Francis S. Flick
By: Schrader, Hofgren,
Brady & Wegner
Attorneys July 8, 1958  F. S. FLICK  2,842,284
CYLINDER END SEAL FOR FLUID PRESSURE CYLINDER
Filed Nov. 14, 1955  2 Sheets-Sheet 2

Inventor:
Francis S. Flick
By Schroeder, Hofgren,
Brady & Wegner
Attorneys ated July 8, 1958

2,842,284

CYLINDER END SEAL FOR FLUID PRESSURE CYLINDER

Francis S. Flick, Melrose Park, Ill., assignor to Flick-Reedy Corporation, a corporation of Illinois Application November 14, 1955, Serial No. 546,384

5 Claims. (Cl. 220—46)

This invention relates to fluid pressure cylinders and more particularly to the connection between the cylinder tube and heads of a precision made piston and cylinder device.

The primary object of this invention is to provide a new and improved seal structure between a cylinder tube and heads of a fluid pressure cylinder.

Another object of the invention is to provide such a sealing structure absolutely preventing the extrusion of resilient sealing material under influence of pressure within the cylinder.

Another object is to provide structure of the character described capable of maintaining absolute concentricity of the cylinder tube and heads in a precision built piston and cylinder device.

A further object of the invention is to provide a fluid pressure cylinder structure, which may be manufactured at less cost than heretofore while obtaining superior leak-proof performance in extremely high pressure applications.

Other features, object and advantages of the present invention will be apparent from the following description of a preferred embodiment illustrated in the accompanying drawings in which:

Figure 1 is a sectional view taken substantially through a piston and cylinder device having the invention therein;

Figure 2 is a sectional view, partly broken away, through the cylinder tube and taken substantially along line 2—2 in Figure 1;

This invention is particularly applicable to fluid pressure cylinders of the type employing a cylinder tube and a head structure at each end of the tube held thereon by tie rods passing through the heads and generally lengthwise of the tube. In such pressure cylinders, there is no fastening connection between the tube and the cylinders, the tie rods taking all of the strain and stress placed on the unit by internal pressure. Piston and cylinder devices so constructed are equipped so that the piston rod can extend through one or both heads. Hydraulic and pneumatic equipment may require other units than piston and cylinder devices such as boosters, accumulators or fluid tanks, all of which may be constructed with the cylinder end seal of this invention.

In the past, pressure seals have been used between the cylinder tubes and heads of the above mentioned type of fluid pressure cylinders. Ordinarily, the seals have been of the O-ring type captive in a groove in the head so that it could contact the internal diameter of the cylinder tube. In order to assemble these units, the heads have been provided with a groove having an inner wall seated against the inner wall of the tube. In other words, the cylinder tube pilots or is guided by its internal diameter on the groove in the head. Under extremely high pressures, which often occur in hydraulic equipment under influence of shock loads, these cylinder structures have caused difficulty in leakage and damage to the seals. The present invention obviates these difficulties as will be apparent from the following descriptive matter.

Figure 3:
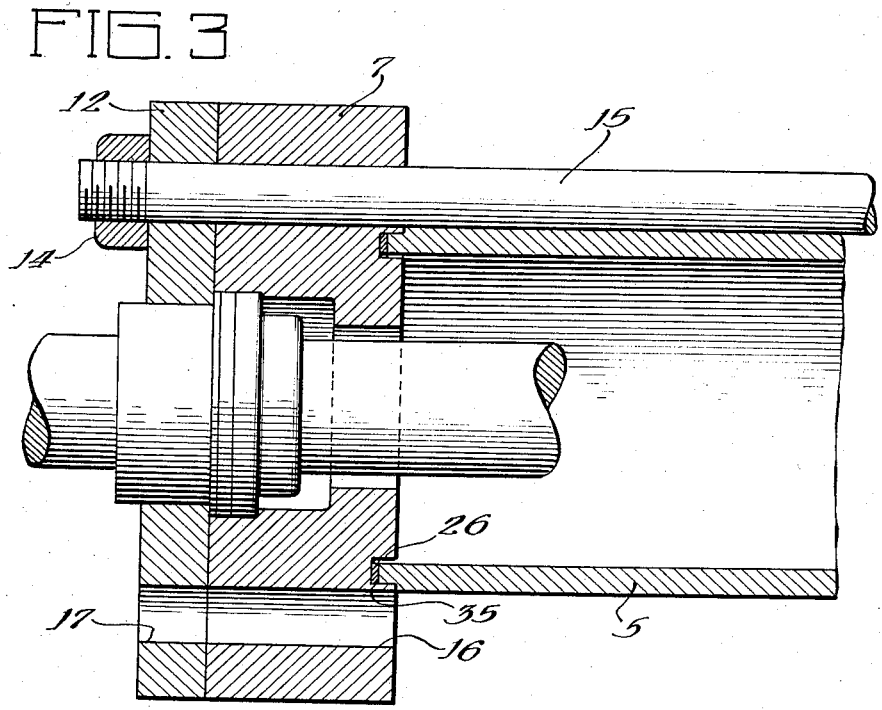
Figure 3 is a fragmentary sectional view with part of the device removed for clarity of illustration and taken substantially along line 3—3 in Figure 2.

Referring particularly to Figure 1, a piston and cylinder device is illustrated which is intended for high pressure hydraulic service. The cylinder tube 5 is provided with a head 6 sometimes referred to as a cap since no piston rod passes through it. A head 7 is placed on the end of the tube 5 opposite the head 6. Each head is equipped with a fluid port 8 and 9, respectively, for the entrance and exit of the hydraulic fluid to and from the interior of the cylinder. The head also carries a piston rod seal structure 10 and a rod bushing 11 held in place by retainer plate 12 so that the piston rod 13 may reciprocally move therethrough. In Figure 1, the nuts 14 on the tie rods are visible and in Figure 3, the tie rod 15 is shown in relation to the heads and cylinder tube. These tie rods pass through aligned bores 16 in the head and 17 in the retainer plate and through similar bores in the head 6 in order to hold the heads and cylinder tubes in assembled relation.

As viewed in Figure 2, it will be noted that the head 7 is square in design so that the tie rods 15 are positioned in the corners of the heads and closely adjacent, in fact, touching the outer wall of the cylinder tube 5. An opening 18 is shown around the piston rod 13 in Figure 2 and comprises the space through which fluid may enter the cylinder from the port 9 by passing around the piston rod 13. The piston 19 shown on the rod is equipped with cup seals 20 and 21 and cushions 22 and 23 for slowing the movement of the piston near the end of its stroke. The structure of the piston, its seals or cushions form no part of the present invention.

This invention is concerned with the structure between the cylinder tube and the heads. In general, the new structure differs from previous practices in that the cylinder tube has an outer surface absolutely concentric with the inner surface of the tube, which outer surface forms a part of the seal. The metal to metal contact provided between the head and the cylinder tube performs the function of sealing against fluid leakage as well as preventing the extrusion of the resilient sealing material from its pressure sealing position. The new structure may operate at much higher shock load pressures than any cylinder structure heretofore since the seal becomes tighter with the higher pressure.

Referring to Figure 1, the cylinder tube 5 is provided with a section 25 at each end of reduced thickness compared to the thickness of the tube wall. The heads are provided with a circular groove 26 for receiving the reduced thickness section of the tube wall. A resilient sealing ring 27 is placed in the bottom of the circular groove for abutting the end of the tube and performing the sealing. In addition to the other structure, there is provided a radial shoulder 28 at the base of the reduced thickness section 25 for the purpose of abutting the fluid head surface and maintaining absolute concentricity between the cylinder tube and heads as well as limiting the amount of compression that may be placed on the sealing ring 27.

Figure 4:
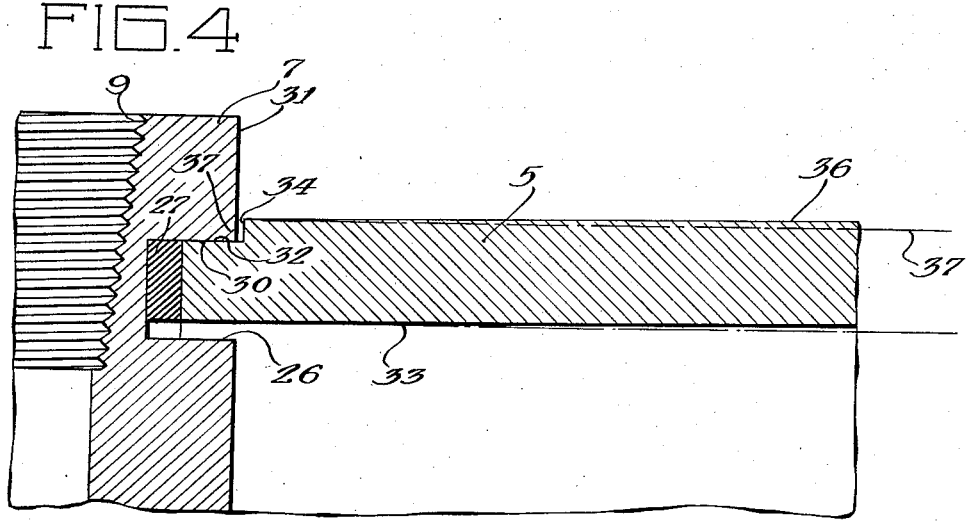
Figure 4 is an enlarged fragmentary sectional view through a portion of the cylinder and head connection illustrating the device under influence of extremely high pressure.

Referring particularly to Figure 4 illustrating the head 7, the groove 26 formed in the head may be machined quite easily as compared to a circular groove with an offset portion previously required to receive the O-ring. The depth of the circular groove 26 is not particularly controlling in the machining as a resilient sealing ring 27 may compensate for slight errors in the depth of the groove. The important surface in the groove is the outer surface 30, which is machined quite accurately to be absolutely concentric with the other opening through the head receiving the piston rod, seals and bushing. The groove is generally a square sided groove which may be easily machined with little tool cost. Since the surface 30 is the only surface which need be extremely accurately formed, the inspection and gauging of the head need only be performed on this one groove wall as far as the groove 26 is concerned.

Other operations performed on the head structure 7 include a finishing of the surface 31 facing the tube to a high degree of accuracy. This surface is flat so that it may be ground to quite accurate tolerances. This is done in order to obtain absolute concentricity between the cylinder and head in the final assembly.

The tube 5 is one having the same internal diameter from end to end. The outer surface 32 of the reduced thickness section is formed with a special tool so that it is absolutely concentric with the inner surface 33 of the tube. The shoulder 34 is formed radially relative to the tube axis so that in assembly this shoulder may abut the accurately ground flat surface 31 of the head to position the tube and the head surfaces normal to each other. As mentioned, the shoulder also limits the compression placed upon the resilient sealing ring 27.

In assembling the fluid pressure cylinder, the mating surfaces 30 of the circular groove in the head and outer surface 32 on the reduced thickness section are visible since they are on the outside portion of a cylinder. The tube pilots on the surface 30 facilitating the assembly. The sealing ring 27 may be placed in the bottom of the groove prior to actual assembly and no stretching or distortion of the ring is necessary in order to so place it. The cylinder does not contact the ring until it approaches the seating position so that the ring cannot be twisted or sheared during the assembly. This insures that the sealing ring is in proper position and physical state to perform its function.

Once the heads are placed in position on the cylinder tube, the tie rods 15 may be placed in position and pulled up tight with the use of the tie rod nuts 14. It will be noted from Figure 3 that the aligned bores 16 and 17 in the head 7 and plate 12 have one wall 35 substantially aligned with the outer surface of the cylinder tube. These bores do not break into the circular groove 26 in the head for the reception of the reduced section of the cylinder tube. This also facilitates manufacture since no deburring of the holes is necessary. Ordinarily, it is preferred to tighten the tie rod nuts to put tensile stress in the tie rods. In so doing, the heads bear against the radial shoulders 34 of the cylinder tube and place some compression in the tube wall. The shoulders, however, prevent undue compression on the sealing ring. An effort is made to have the ends of the cylinders in a plane normal to the tube axis so that the sealing ring will be generally compressed equally throughout its circular length.

The operation of the present fluid pressure cylinder, particularly, under shock loads of extremely high pressure indicate the superior sealing effect achieved with the present invention. Figure 4 diagrammatically illustrates the condition of the cylinder tube and head under influence of an extremely high pressure. It has been found that the cylinder tube will expand a few thousandths of an inch in diameter under influence of the extreme load. This is illustrated in Figure 4 wherein the clyinder tube portion 36 in full lines is shown as expanded over the dotted line position 37. While the expansion is exaggerated in the drawing in order to illustrate the phenomenon, it should be understood that the degree of expansion has been about .010 of an inch as actually measured. Additionally, a small gap is shown between the flat surface 31 and the shoulder 34 indicating that under extremely high loads the tie rods may be strained sufficiently to allow some relative movement between the cylinder tube and the heads. This also has been exaggerated for clarity of illustration.

A result of this is that under extremely high pressures no leakage occurs between the cylinder tube and the head structure. The mating surfaces 30 and 32 are pressed together by the internal pressure. These surfaces are so accurately formed that the metal to metal contact under influence of the pressure actually perform a good sealing operation. Additionally, however, they perform the function of holding the resilient sealing ring 27 in place against extrusion. The sealing ring being resilient tends to enter any crevice or space which the pressure forces it into. The mating surfaces provide no such space. Thus, the sealing ring can perform its function without damage even under extremely high pressures.

By providing the present seal structure between the cylinder and the heads, a much lower cost of manufacturing is achieved and better sealing structure results. The seal operates under pressure both as to its metal contact and with the resilient sealing ring. An additional feature of the connection between the tube and head is the resistance provided against the head dishing under pressure. Internal pressures tend to bend the metal concavely between the tie rods. The tendency to dish is resisted by the pressure transmitted through the tube wall to the corner 31 of the head adjacent the juncture of the outer ground surface 31 and the surface 30 of the circular groove. Pressure applied to this portion of the head structure through the cylinder wall counteracts the bending of the head between the tie rods. Less movement occurs as a result of this counterbalancing.

The circular groove in the head for receiving the end of the cylinder tube has been described as of square design. It is contemplated that the outer surface 30 may be given a slight outward taper of only a few thousandths of an inch to insure that seating of the tube in the groove will result in absolute concentricity between heads and tube. The life of the complete structure, particularly seals, is greatly extended in a pressure cylinder having absolute concentricity such as is possible with the present invention.

The foregoing detailed description has been given for clearness of understanding only, and no unnecessary limitations should be understood therefrom, for some modifications will be obvious to those skilled in the art.

I claim:

1. A fluid pressure cylinder assembly, comprising: a cylinder tube having a continuous circular cylindrical inner surface and a reduced thickness section at one end with an outer surface concentric with the inner surface of the tube; a head on said end of the cylinder having a circular groove for receiving the reduced section of the tube with the outer surface of said reduced section piloting on the outer wall surface of said groove, said surfaces engaging in sealing relation; a resilient sealing ring in the bottom of the groove in sealing contact with the end of the tube reduced section, said circular groove having a width slightly in excess of the thickness of said reduced thickness tube section to provide clearance between the inner surface of the cylinder and the inner face of the groove for application of internal fluid pressure to the sealing ring in the bottom of the groove; and tie rods securing the head and cylinder tube together.

2. A fluid pressure cylinder assembly, comprising: a cylinder tube having a circular cylindrical inner surface from end to end and a reduced thickness section at each end with an outer surface concentric with the inner surface of the tube; a head on each end of the cylinder having a circular groove for receiving the reduced section of the tube with the outer surface of said reduced section piloting on the outer wall surface of said groove, said surfaces engaging in sealing relation; a resilient sealing ring in the bottom of each groove in sealing contact with the end of the respective tube reduced section, said circular groove in each head having a width slightly in excess of the thickness of said reduced thickness tube section to provide clearance between the inner surface of the cylinder and inner face of the groove for application of internal fluid pressure to the sealing ring in the bottom of the groove; and tie rods securing the heads and cylinder tube together in assembled relation.

3. A fluid pressure cylinder assembly, comprising: a cylinder tube having a circular cylindrical inner surface from end to end and a reduced thickness section at each end with an outer surface concentric with the inner surface of the tube; a head on each end of the cylinder having a circular groove for receiving the reduced section of the tube with the outer surface of said reduced section piloting on the outer wall surface of said groove, said surfaces being tapered longitudinally of the cylinder tube in a direction toward the outer surface of the head and engaging in sealing relation; a resilient sealing ring in the bottom of each groove in sealing contact with the end of the respective tube reduced section, said circular groove in each head having a width slightly in excess of the thickness of said reduced thickness tube section to provide clearance between the inner surface of the cylinder and inner face of the groove for application of internal fluid pressure to the sealing ring in the bottom of the groove; and tie means securing the heads and cylinder tube together in assembled relation.

4. A fluid pressure cylinder assembly, comprising: a cylinder tube having a continuous circular cylindrical inner surface and a reduced thickness section at one end with an outer surface concentric with the inner surface of the tube; a head on said end of the cylinder having a circular groove for receiving the reduced section of the tube with the outer surface of said reduced section piloting on the outer wall surface of said groove, said surfaces being tapered longitudinally of said cylinder tube in a direction toward the outer surface of the head and engaging in sealing relation; a resilient sealing ring in the bottom of the groove in sealing contact with the end of the tube reduced section, said circular groove having a width slightly in excess of the thickness of said reduced thickness tube section to provide clearance between the inner surface of the cylinder and the inner face of the groove for application of internal fluid pressure to the sealing ring in the bottom of the groove; and tie means securing the head and cylinder tube together.

5. A fluid pressure cylinder assembly, comprising: a cylinder tube having a continuous cylindrical inner surface and a reduced thickness section at one end with an outer surface concentric with the inner surface of the tube; a head on said end of the cylinder having a circular groove for receiving the reduced section of the tube with the outer surface of the reduced section and outer wall of the groove engaging in sealing relation, said head having an opening therethrough with its axis concentric with the axis of the cylinder tube and an inner face on the head lying in a flat plane normal to said opening axis; a longitudinally facing shoulder formed on the cylinder tube at the base of the reduced thickness section externally thereof and being normal to the cylinder tube axis, said shoulder and head inner face abutting to maintain the longitudinal axes of the head opening and cylinder tube in longitudinal alignment when the head and cylinder tube are in assembled relation; a resilient sealing ring in the bottom of the groove in sealing contact with the end of the tube reduced section, said circular groove having a width slightly in excess of the thickness of said reduced section to provide clearance between the inner surface of the cylinder and inner face of the groove for application of internal fluid pressure to the sealing ring in the bottom of the groove; and tie means securing the head and cylinder tube together.

References Cited in the file of this patent

UNITED STATES PATENTS

| 1,200,118 | Keeler | Oct. 3, 1916 |
| 1,429,303 | Sumbling | Sept. 19, 1922 |
| 2,611,506 | Scheer | Sept. 23, 1952 |
| 2,673,130 | Becker | Mar. 23, 1954 |

FOREIGN PATENTS

| 207,855 | Great Britain | Dec. 4, 1923 |